United States Patent [19]

Lew

[11] Patent Number: 4,646,568
[45] Date of Patent: Mar. 3, 1987

[54] FLAP PUMP-FLOW METER

[76] Inventor: Hyok S. Lew, 7890 Oak St., Arvada, Colo. 80005

[21] Appl. No.: 730,853

[22] Filed: May 6, 1985

[51] Int. Cl.$^4$ .............................................. G01F 3/08
[52] U.S. Cl. ...................................... 73/260; 418/268
[58] Field of Search .................... 73/253, 260; 418/268

[56] References Cited

U.S. PATENT DOCUMENTS

| | | | |
|---|---|---|---|
| 600,173 | 3/1898 | Robarts | 73/260 X |
| 1,294,760 | 2/1919 | Bowser | 73/260 X |
| 2,033,719 | 3/1936 | Lamb, Jr. | 73/260 X |
| 2,720,191 | 10/1955 | Vas | 73/260 X |

Primary Examiner—Herbert Goldstein

[57] ABSTRACT

This invention discloses a device usable as a pump or a compressor or a flow meter that includes a plurality of flaps having a substantially "comma-shaped" cross section assembled in a parallel arrangement wherein the flaps are respectively pivotable about a plurality of pivoting axes axisymmetrically positioned about the central axis of the assembly of the flaps. The outer boundary of the cross section of the assembly of the flaps takes a substantially circular configuration when all of the flaps are pivoted to the fully retracted position. The assembly of the flaps is rotatably disposed eccentrically within a cylindrical cavity having a cross section of a circle or ellipse or other configuration of smooth perimeter which cylindrical cavity includes a fluid inlet and outlet disposed at two substantially diametrically opposite positions across a plane including the central axis of the assembly of the flaps and the central axis of the cylindrical cavity.

21 Claims, 13 Drawing Figures

FLAP PUMP-FLOW METER

BACKGROUND OF THE INVENTION

In the present day fluid handling technology, the sliding vane pump or compressor is widely employed as a fluid moving device as well as a fluid flow measuring device. The sliding vane pump or compressor comprises a plurality of vanes slidably engaging a plurality of radial slits included in a circular rotor cylinder that is rotatably disposed eccentrically within a circular cylindrical cavity having a fluid inlet and outlet. The sliding movements of the vanes relative to the slits are subjected to a high friction, which creates not only wear and tear on the vanes as well as the slits but also the excessive power consumption by the pumps or compressors and the high pressure drop in case of flow meters. The arrangement of the vanes slidably retained in the slits of the rotor has an inherent weakness in the structural rigidity and strength that limits the application of vane pumps or compressors to moderately low pressures.

The primary object of the present invention is to provide the flap pump-flow meter that includes all the advantages of the operating principles of the sliding vane pump-flow meter without accompanying the disadvantages of the sliding vane pump-flow meter.

Another object is to provide a positive displacement rotary pump of a high efficiency and capable of delivering a high pressure head.

A further object is to provide a positive displacement rotary pump of a compact and light weight construction.

Yet another object is to provide a positive displacement rotary flow meter of a high sensitivity and great accuracy that is applicable to high pressure fluid flow.

Yet a further object is to provide a positive displacement rotary flow meter of a compact construction including simple elements.

These and other objects of the present invention will become clear as the description thereof proceeds.

BRIEF DESCRIPTION OF THE FIGURES

The present invention may be described with a greater clarity and specificity by referring to the following figures.

DESCRIPTION OF ILLUSTRATED EMBODIMENTS

Figure 1:
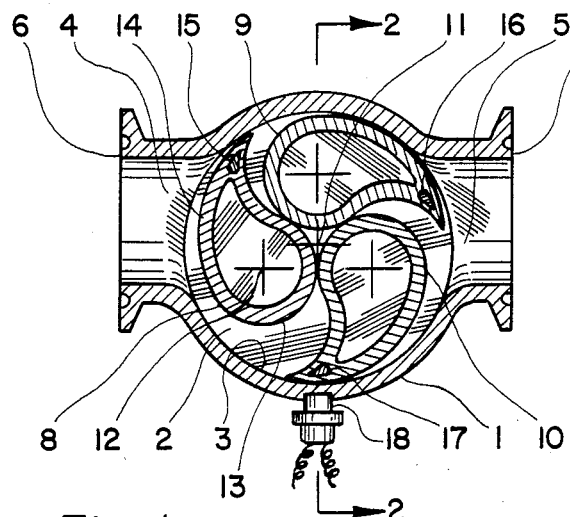
FIG. 1 illustrates a cross section of an embodiment of the flap pump-flow meter of the present invention.

In FIG. 1 there is illustrated a cross section of an embodiment of the flap pump-flow meter constructed in accordance with the principles of the present invention, which cross section is taken along a plane including the central axis of the fluid inlet and the outlet and perpendicular to the axis of rotation of the rotor assembly including a plurality of the flaps. The body 1 of the flap pump-flow meter 1 includes a cylindrical cavity 2 having a smoothly contoured side wall 3 and two closed ends. The cross section of the cylindrical cavity 2 may be a circle or an ellipse or any other shape of a smoothly contoured perimeter. A pair of flow ports 4 and 5 are disposed through the side wall 3 of the cylindrical cavity 2 at two substantially diametrically opposite positions. The extremities of the flow ports 4 and 5 include adapting means 6 and 7, respectively, for connecting the flap pump-flow meter to a pipe line. A plurality of the flaps 8, 9, 10, etc. are disposed within the cylindrical cavity 2 wherein each of the flaps is rotatable about the central axis 11 of the assembly of the flaps and pivotable about the pivoting axis 12 of each flap that coincides with the center of the circle including the substantially semicircular leading edge or head portion 13 of the cross section of the flap. The crescent trailing edge or tail portion 14 of the cross section of the flap includes a substantially pointed edge, where the convex and concave edges of the cross section of the flap merge. The center line 11 of the assembly of the flaps 8, 9, 10, etc. is located eccentrically from the center line of the cylindrical cavity 2 wherein the minimum distance between the center line 11 of the assembly of the flaps and the wall of the cylindrical cavity 2 is substantially equal to the radius of the circle including the outer perimeter of the assembly of the flaps at the fully retracted position and the maximum distance therebetween is substantially less than the distance from the center line 11 of the assembly of the flaps to the tip of the trailing edge of the flap at the fully extended position. The pivoting centers of the flaps coinciding with the center of the circle including the semicircular leading edge of the cross section of the flaps are axixymmetrically located about the central axis of 11 of the assembly of the flaps and spaced from each other in such a way that the semicircular loading edges of the flaps are in contact with each other in a leak proof rolling contact. The trailing edges of the flaps 8, 9, 10, etc. may include magnetic bars 15, 16, 17, etc. imbeded in the trailing edges of the flaps, respectively, in order to establish a constant sliding contact between the trailing edge of the flaps and the side wall 3 of the cylindrical cavity 2. Of course, the side wall 3 of the cylindrical cavity 2 must include a ferro-magnetic material in order to make the magnet-tipped flap effective. The arrangement shown in FIG. 1 includes means for rotating the assembly of the flaps about the central axis thereof when the assembly functions as a pump or compressor, while it may include a sensor 18 that counts the frequency of the trailing edges of the flaps passing thereby when it functions as a flow meter. It should be noticed that the flow ports 4 and 5 are disposed in the pattern of mirror image to one another with respect to a plane including the central axis of the assembly of the flaps and the central axis of the cylindrical cavity 2. The flaps may be made hollow in order to reduce the mass and the centrifugal force resulting therefrom.

Figure 2:
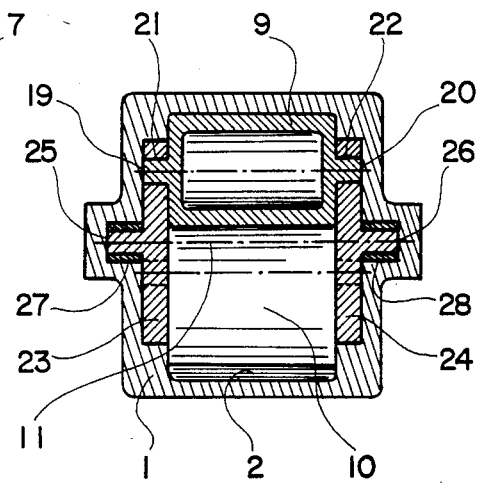
FIG. 2 illustrates another cross section of the flap pump-flow meter shown in FIG. 1.

In FIG. 2 there is illustrated a cross section of the arrangement shown in FIG. 1 taken along plane 2—2 as shown in FIG. 1. In this particular embodiment each flap includes a pair of stub shafts 19 and 20 extending from two extremities thereof in line with the pivoting axis coinciding with the center of the circle including the substantially semicircular leading edge of the cross section of the flap, which rotatably engage the holes 21, 22, etc. respectively included in a pair of the circular discs 23 and 24 rotatably supported by a pair of stub shafts 25 and 26 extending therefrom in the coaxial relationship and supported by the bearings 27 and 28 secured to the end walls of the cylindrical cavity 2. It should be noticed that the circular discs 23 and 24 are respectively disposed in two counter bores respectively included in two end walls of the cylindrical cavity wherein the inside end face of the circular discs 23 and 24 are flush to the natural end wall of the cylindrical cavity 2. It should be understood that the components assembled to a pump of flow meter as shown in FIGS. 1 and 2 must have the precise dimensions whereby the interfaces therebetween do not provide any gap through which the fluid may creep and leak. The circular discs 23 and 24 rotatable about the central axis 11 of the assembly of the flaps enables the flaps 8, 9, 10, etc. to rotate about the central axis 11, while the pivotable support of the flaps by the circular discs 23 and 24 enablesthe flaps to pivot about the pivoting axis coinciding with the center of the circle including the substantially semicircular leading edge of the cross section of the flap. When the arrangement shown in FIGS. 1 and 2 is used as a pump or compressor the stube shafts 25 and 26 should be made to extend through the end walls of the cylindrical cavity 2 in a leak-proof manner and coupled to a power input shaft. When the arrangement shown in FIGS. 1 and 2 is used as a flow meter, it should include a counter that counts the frequency of the flaps passing thereby. It is not difficult at all to realize from FIG. 1 that, when the assembly of the flaps is rotated in the clockwise direction by means of an external power input, the fluid will be forcibly moved from the right hand side port 5 to the left hand side port 4 and, consequently, it is a pump or compressor. When the fluid moves from the left hand side port 4 to the right hand side port 5 under a pressure gradient, the assembly of the flap will rotate in the counter clockwise direction at a rotational speed proportional to the rate of flow of the fluid and, consequently, it is a positive displacement flow meter. The particular embodiment shown in FIG. 2 is one of many arrangements providing the kinematical functions for the flaps as illustrated in FIG. 1.

Figure 3:
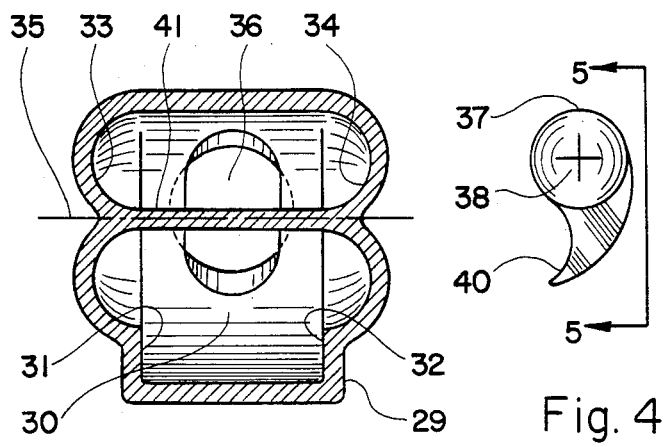
FIG. 3 illustrates a cross section of the body of another embodiment of the flap flow meter, which cross section is taken along a plane equivalent to that shown in FIG. 1.

In FIG. 3 there is illustrated a cross section of the body of an embodiment of the flap flow meter operating under the same principles as illustrated in FIG. 1, which cross section is taken along the same plane as the plane 2—2 shown in FIG. 1. The body 29 of the flow meter shown in FIG. 3 includes a cylindrical cavity 30 equivalent to the cylindrical cavity 2 shown in FIG. 1. Two end walls 31 and 32 of the cylindrical cavity 30 respectively includes a pair of annular grooves 33 and 34 having semicircular cross section. The common central axis 35 of the two annular grooves 33 and 34 are off set from the central axis of the cylindrical cavity 30. The two fluid ports including the port 36 shown in FIG. 3 is arranged in the same way as illustrated in FIG. 1.

Figures 4, 5:
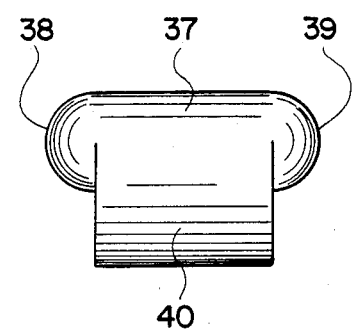
FIG. 4 illustrates an end view of the flap usable in conjunction with the body shown in FIG. 3.
FIG. 5 illustrates another view of the flap shown in FIG. 4.

In FIG. 4 there is illustrated an end view of the flap having a substantially semicircular leading edge 37, two hemispherical extremities 38 and 39 having the same radius as the semicircular leading edge 37 and a substantially crescent trailing edge 40, which combination has essentially the same cross section as that of the flaps shown in FIG. 1.

In FIG. 5 there is illustrated another view of the flap shown in FIG. 4 viewed through plane 5—5 as shown in FIG. 4, which may be constructed with a solid or a hollow core as shown in FIG. 1. The radius of the hemispherical extremities 38 and 39 are closely matched to the radius of the cross section of the annular grooves 33 and 34 shown in FIG. 3 whereby the flaps shown in FIGS. 4 and 5 confined within the cylindrical cavity 30 shown in FIG. 3 are rotatable about the rotating axis 35 and pivotable about the pivoting axis passing through the center of two hemispherical extremities of the flap as two hemispherical extremities of the flaps slidably and rotatably engage two annular grooves 33 and 34 in a substantially leak-proof manner. The radius of the annular groove measured from the rotating axis 35 may be proportioned to the radius of the substantially semicircular leading edge of the flap in such a way that the semicircular leading edges of adjacent flaps confined within the cylindrical cavity 30 establish a leak-proof sliding contact. In such a case the midsection of the central cylindrical member 41 coaxially disposed with the rotating axis 35 can be omitted. It should be understood that, in practice, the body of flow meter shown in FIG. 3 should be a two piece construction whereby the flaps can be confined therein after the body and flaps are manufactured separately.

Figure 6:
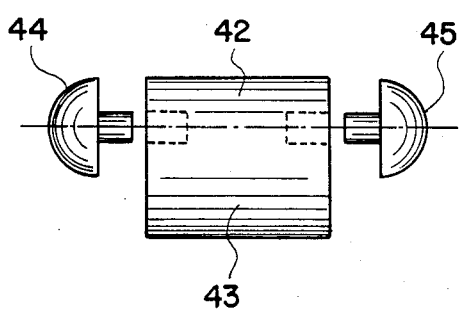
FIG. 6 illustrates a further embodiment of the construction of the flap shown in FIGS. 4 and 5.

In FIG. 6 there is illustrated another embodiment for constructing the flap of one-piece construction shown in FIGS. 4 and 5. The cylindrical construction of the flap with a substantially semicircular leading edge 42 and a crescent trailing edge 43 is provided with two hemispherical extremities by a pair of hemispherical members 44 and 45 rotatably connected to the cylindrical flap, wherein the hemispherical members are rotatable relative to the cylindrical flap about the pivoting axis coinciding with the centers of the two hemispherical members and the center line of the semicircular leading edge of the flap. The construction of the flap shown in FIG. 6 has an advantage over the construction of the flap shown in FIG. 5 in view that the rotating movement of two hemispherical ends 44 and 45 relative to the cylindrical midsection of the flap eliminates the localized wear on the hemispherical ends of the flap.

Figure 7:
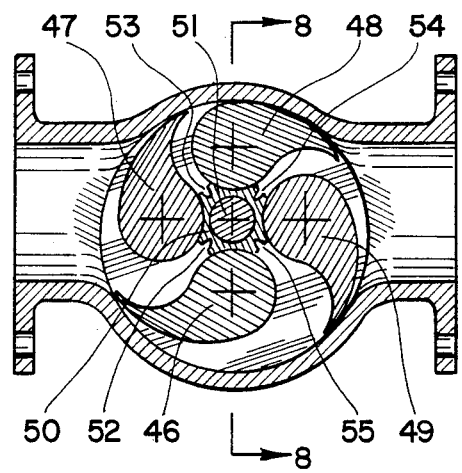
FIG. 7 illustrates a cross section of a further embodiment of the flap pump-flow meter of the present invention.

In FIG. 7 there is illustrated a cross section of a further embodiment of the flap pump-flow meter having essentially the same construction as that shown in FIG. 1 with two exceptions being that, firstly, the flaps 46, 47, 48, 49, etc. are not in contact to each other in contrast to the flaps 8, 9, 10, etc. shown in FIG. 1 and, secondly, a seal including a plurality of sets of lips 52, 53, 54, 55, etc. supported by the shaft 51 is simultaneously in contact with the substantially semicircular leading edges of the flaps. It should be mentioned that the number of flaps employed in each arrangement is merely a matter of design, as the arrangement shown in FIG. 1 may include more than three flaps, while that of FIG. 7 may include three or more than four flaps. It is also a matter of design to construct the flap with a solid or hollow core. The magnetic bars imbeded in the trailing edge of the flaps as shown in FIG. 1 are usually not required in pumps as the centrifugal force generated by the high rate of rotation of the assembly of the flaps ensures the sliding contact between the trailing edges of the flaps and the cylindrical walls of the cylindrical cavity.

Figure 8:
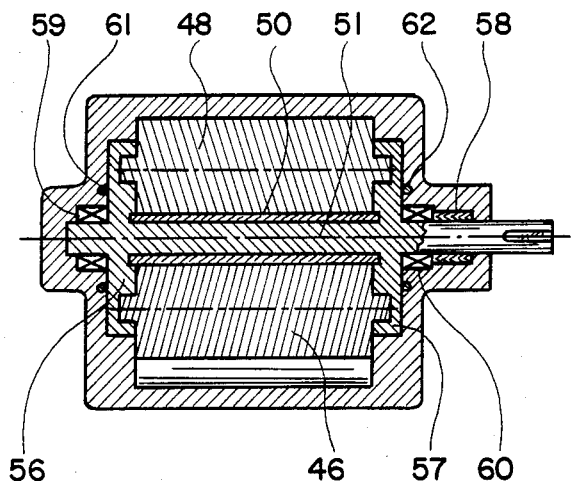
FIG. 8 illustrates another cross section of the flap pump-flow meter shown in FIG. 7.

In FIG. 8 there is illustrated a cross section of the flap pump-flow meter shown in FIG. 7 taken along plane 8—8 as shown in FIG. 7. The arrangements illustrated in FIG. 8 is similar to that of FIG. 2 with a few exceptions. The two circular discs 56 and 57 rotatably and pivotably supporting the flaps are nonrotatably connected to the shaft 51 having at least one extremity extending through the end wall of the cylindrical cavity in leak-proof manner, as facilitated by a sealing means such as the packed seal 58, for coupling thereof with a power input shaft. The bearings 59 and 60 are respectively isolated from the medium being pumped by the annular seals 61 and 62. It should be understood that the construction illustrated in FIGS. 7 and 8 may be used as a flow meter wherein the amount of the volume flow is measured by measuring the speed of rotation of the shaft 51. In general, the construction shown in FIGS. 2 or 3 is more suitable for a flow meter compared with that of FIG. 8, as the former arrangement operates with much less frictional resistance.

Figure 9:
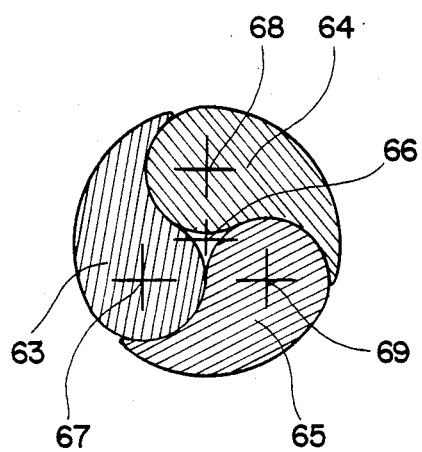
FIG. 9 illustrates a cross section of an embodiment of the assembly of the flaps usable in conjuction with the flap pump-flow meter of the present invention.

In FIG. 9 there is illustrated a cross section of the assembly of the flaps 63, 64, 65, etc. wherein the assembly itself is rotatable about the central axis 66 thereof and each of the flaps 63, 64, 65, etc. is respectively pivotable about each of the pivoting axis 67, 68, 69, etc., each of which coincides with the center of the circle including the substantially semicircular leading edge of each of the flaps 63, 64, 65, etc. The outer perimeter of the assembly of the flaps takes on a substantially circular configuration when all of the flaps are pivoted to the fully retracted position. In this arrangement, the pivoting axis 67, 68, 69, etc. are axisymmetrically positioned about the central axis 66 wherein the semicircular leading edges of the flaps are under a leak-proof slidable contact therebetween. The radius of the circle including the outer perimeter of the assembly of the flaps at the fully retracted position is substantially equal to the distance between the central axis 66 and the pivoting axis 67 plus the radius of the semicircular leading edge of the flap. The assembly of the flaps shown in FIG. 9 is essentially the same one as that employed in the flap pump-flow meter shown in FIG. 1 with the exceptions of the hollow core and the magnetic bar included therein. It is easy to realize that less or more than three flaps can be assembled into an assembly similar to that shown in FIG. 9.

Figure 10:
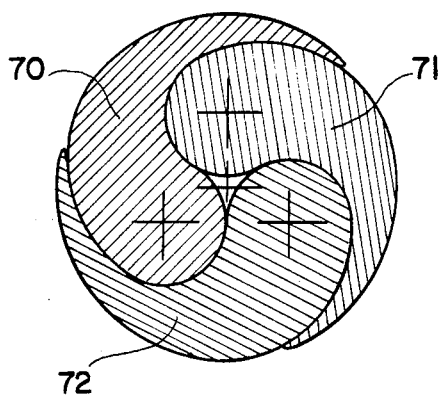
FIG. 10 illustrates a cross section of another embodiment of the assembly of the flaps.

In FIG. 10 there is illustrated a cross section of another assembly of flaps 70, 71, 72, etc. constructed essentially in the same way as that of FIG. 9 with one exception being that the radius of the circle including the outer perimeter of the assembly of the flaps at the fully retracted position is significantly greater than the distance between the central axis of assembly and the pivoting axis of the flap plus the radius of the semicircular leading edge of the flap.

Figure 11:
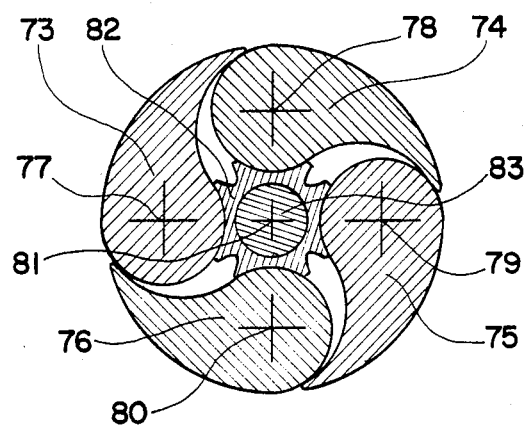
FIG. 11 illustrates a cross section of a further embodiment of the assembly of the flaps.

In FIG. 11 there is illustrated a cross section of a further assembly of the flaps 73, 74, 75, 76, etc. wherein the pivoting axis 77, 78, 79, 80, etc. are axisymmetrically located about the central axis 81 of the assembly in such a way that the semicircular leading edges of the flap are not in contact to each other. A seal 82 including a plurality of sets of lips mounted on the central shaft 83 is simultaneously in contact with all of the semicircular leading edges of the flaps. The outer perimeter of the assembly of the flaps at the fully retracted position takes on a circular configuration as defined in conjunction with FIG. 9 or 10. The assembly of the flaps shown in FIG. 11 is essentially the same one as that included in the flap pump-flow meter shown in FIG. 7, which assembly may include the flaps of less or greater number than four.

Figure 12:
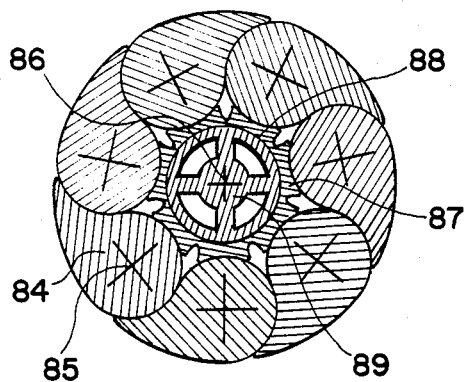
FIG. 12 illustrates a cross section of yet another embodiment of the assembly of the flaps.

In FIG. 12 there is illustrated a cross section of yet another assembly of the plurality of flaps 84, etc. pivotable about the pivoting axis 85, etc. coinciding with the center of the circle including the substantially semicircular leading edge of the flap, which assembly is rotatable about the central axis 86 thereof. The creeping movement of the fluid across the assembly is checked by the leak-proof sliding contact between the substantially semicircular leading edges of the flaps as well as by the seal 87 including a plurality of sets of the lips mounted on the drum 88 coaxially affixed to the central shaft 89, which seal is simultaneously in contact with all of the semicircular leading edges of the flaps. The assembly of the flaps of this combination is particularly suitable for constructing a flap pump.

Figure 13:
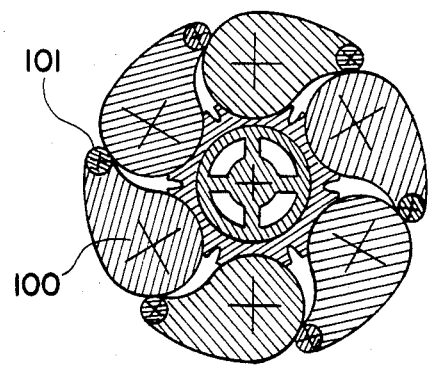
FIG. 13 illustrates a cross section of yet a further embodiment of the assembly of the flaps.

In FIG. 13 there is illustrated a cross section of yet a further assembly of the flaps 100, etc. assembled essentially in the same construction as that shown in FIG. 12 with two exception being that, firstly, the substantially semicircular leading edges of the flaps are not in contact to each other and, secondly, the tips of the crescent trailing edges of the flaps include the circular cylindrical rollers 101, etc, rotatably secured to the flaps, respectively. The outer perimeter of the assembly of the flaps including the trailing edge rollers takes on a substantially circular configuration when all of the flaps are pivoted to the fully retracted position. It should be mentioned that the trailing edge rollers as shown in FIG. 13 may be included in other assemblies of the flaps such as those shown in FIGS. 9, 10, 11 and 12. The magnetic bars and the hollow cores of the flaps as shown in FIG. 1 may be incorporated into those flap assemblies shown in FIGS. 9 through 13. It should be understood that the outer perimeter of the assembly of the flaps at the fully retracted position need not be of an exact circle, as it is sufficient that the tip of the crescent trailing edge of each flap or a point on the convex edge of the crescent trailing edge of each flap lies on a common circle when all the flaps are pivoted to the fully retracted position.

While the principles of the present invention have now been made clear by the illustrative embodiments, it will be immediately obvious to those skilled in the art many modifications in the structures, arrangements, proportion, elements and materials which are particularly adapted to the specific working environments and operating conditions in the practice of the invention without departing from those principles.

I claim:

1. A fluid handling device comprising in combination:
   (a) a body including a cylindrical cavity having a cylindrical wall and two closed ends, said cylindrical cavity including a first port disposed through a portion of said cylindrical wall and a second port disposed through another portion of said cylindrical wall;

(b) a first end disc disposed adjacent to one closed end of said cylindrical cavity and rotatable about an axis of rotation parallel to and offset from the geometric central axis of said cylindrical cavity;

(c) a second end disc disposed adjacent to the other closed end of said cylindrical cavity and rotatable about said axis of rotation; and (d) a plurality of flaps disposed parallel to and about said axis of rotation intermediate said first and second end discs within said cylindrical cavity, each of said plurality of flaps having a first convex cylindrical surface of a first radius disposed parallel and adjacent to said axis of rotation; a second convex cylindrical surface smoothly extending from one boundary of said first convex cylindrical surface wherein at least a portion of said second convex cylindrical surface is generated by a second radius greater than said first radius, and a concave cylindrical surface smoothly extending from the other boundary of said first convex cylindrical surface and merging with said second convex cylindrical surface in an accute angle providing a substantially sharp edge wherein combination of said cylindrical surfaces provides a cross section of said flap having a first edge of a substantially round geometry and a second edge of a substantially pointed crescent geometry, each of said plurality of flaps supported by said first and second end discs in a substantially rotationally symmetric pattern about said axis of rotation and pivotably about an axis of pivoting coinciding with the origin of said first radius; wherein said concave cylindrical surface of one flap accomodates said first convex cylindrical surface of another flap adjacent to said one flap enabling said flaps to fold into a position wherein at least a portion of said second convex cylindrical surface substantially coincides with a hypothetical circular cylindrical surface concentrically disposed about said axis of rotation;

wherein the minimum distance from said axis of rotation to said cylindrical wall of the cylindrical cavity is substantially equal to said second radius of the second convex cylindrical surface of the flap, and the maximum distance from said axis of rotation to said cylindrical wall is less than the sum of distance between said axis of rotation and said axis of pivoting and the distance between said axis of pivoting and said second edge of the flap.

2. The combination as set forth in claim 1 wherein said combination includes means for rotating said first and second end discs.

3. The combination as set forth in claim 2 wherein said first edge of the flaps adjacent to one another is substantially in contact with one another.

4. The combination as set forth in claim 2 wherein said combination includes a sealing means coaxially disposed with said axis of rotation and substantially in contact with said first edges of the flaps.

5. The combination as set forth in claim 2 wherein said first and second end discs are connected to one another by a rigid elongated member coaxially disposed with said axis of rotation.

6. The combination as set forth in claim 2 wherein said combination includes magnet imbedded in said second edge of the flaps and said cylindrical wall of the cylindrical cavity includes magnetically reacting material.

7. The combination as set forth in claim 2 wherein said combination includes rollers rotatably affixed to said flaps adjacent to the second edge of said flaps for limiting the sliding contact between the second edge of the flaps and the cylindrical wall of said cylindrical cavity.

8. The combination as set forth in claim 2 wherein said combination includes means for measuring the rate of rotation of said first and second end discs as a measure of fluid flow moving through said first and second ports.

9. The combination as set forth in claim 1 wherein said combination includes means for measuring the rate of rotation of said first and second end discs as a measure of fluid flow moving through said first and second ports.

10. The combination as set forth in claim 9 wherein said first edge of the flaps adjacent to one another is substantially in contact with one another.

11. The combination as set forth in claim 9 wherein said combination includes a sealing means coaxially disposed with said axis of rotation and substantially in contact with said first edges of the flaps.

12. The combination as set forth in claim 9 wherein said first and second end discs are connected to one another by a rigid elongated member coaxially disposed with said axis of rotation.

13. The combination as set forth in claim 9 wherein said combination includes magnet imbedded in said second edge of the flaps and said cylindrical wall of the cylindrical cavity includes magnetically reacting material.

14. The combination as set forth in claim 9 wherein said combination includes rollers rotatably affixed to said flaps adjacent to the second edge of said flaps for limiting the sliding contact between the second edge of the flaps and the cylindrical wall of said cylindrical cavity.

15. A fluid flow measuring device comprising in combination:

(a) a body including a cylindrical cavity having a cylindrical wall and two closed ends, said cylindrical cavity including a first port disposed through a portion of said cylindrical wall and a second port disposed through another portion of said cylindrical wall;

(b) a first annular groove disposed in the first closed end of said cylindrical cavity coaxially about an axis of rotation parallel to and offset from the geometric central axis of said cylindrical cavity;

(c) a second annular groove disposed in the second closed end of said cylindrical cavity coaxially about said axis of rotation;

(d) a plurality of flaps disposed parallel to and about said axis of rotation intermediate said first and second closed ends within said cylindrical cavity, each of said plurality of flaps having a first convex cylindrical surface of a first radius disposed parallel and adjacent to said axis of rotation; a second convex cylindrical surface smoothly extending from one boundary of said first convex cylindrical surface wherein at least a portion of said second convex cylindrical surface is generated by a second radius greater than said first radius; and a concave cylindrical surface smoothly extending from the other boundary of said first convex cylindrical surface and merging with said second convex cylindrical surface in an accute angle providing a substantially sharp edge wherein combination of said cylindrical surfaces provides a cross section of said flap having a first edge of a substantially round geometry and a second edge of a substantially pointed crescent geometry, each of said plurality of flaps supported by said first and second annular grooves orbitably and pivotably receiving a pair of protrusions respectively extending from the two extremities of said flap in a coaxial relationship with the origin of said first radius; wherein said concave cylindrical surface of one flap accomodates said first convex cylindrical surface of another flap adjacent to said one flap enabling said flaps to fold into a position wherein at least a portion of said second convex cylindrical surface substantially coincides with a hypothetical circular cylindrical surface concentrically disposed about said axis of rotation; wherein the minimum distance from said axis of rotation to said cylindrical wall of the cylindrical cavity is substantially equal to said second radius of the second convex cylindrical surface of the flap, and the maximum distance from said axis of rotation to said cylindrical wall is less than the sum of distance between said axis of rotation and said protrusion and the distance between said protrusion and said second edge of the flap.

16. The combination as set forth in claim 15 wherein said combination includes means for counting the rate of rotation of said flaps about said axis of rotation as a measure of fluid flow flowing through said first and second ports.

17. The combination as set forth in claim 16 wherein said first edges of adjacent flaps are substantially in contact with one another.

18. The combination as set forth in claim 17 wherein an elongated member extending from said first closed end to said second closed end of the cylindrical cavity and disposed coaxially with said axis of rotation is simultaneously in contact with said first edges of the flaps.

19. The combination as set forth in claim 16 wherein each of said protrusions comprises a roller extending from the extremity of said flap.

20. The combination as set forth in claim 19 wherein said first edges of adjacent flaps are substantially in contact with one another.

21. The combination as set forth in claim 20 wherein an elongated member extending from said first closed end to said second closed end of the cylindrical cavity and disposed coaxially with said axis of rotation is simultaneously in contact with said first edges of the flaps.

* * * * *